United States Patent
Fu et al.

(10) Patent No.: US 11,915,245 B2
(45) Date of Patent: *Feb. 27, 2024

(54) METHOD FOR DYNAMICALLY RECONFIGURING MACHINE LEARNING MODELS

(71) Applicant: Visa International Service Association, San Francisco, CA (US)

(72) Inventors: Fangfang Fu, Austin, TX (US); Ajay Raman Rayapati, Georgetown, TX (US); Yu Gu, Austin, TX (US)

(73) Assignee: Visa International Service Association, San Francisco, CA (US)

(*) Notice: Subject to any disclaimer, the term of this patent is extended or adjusted under 35 U.S.C. 154(b) by 66 days.

This patent is subject to a terminal disclaimer.

(21) Appl. No.: 17/463,539

(22) Filed: Aug. 31, 2021

(65) Prior Publication Data
US 2021/0398132 A1 Dec. 23, 2021

Related U.S. Application Data

(63) Continuation of application No. 16/593,853, filed on Oct. 4, 2019, now Pat. No. 11,132,687.

(51) Int. Cl.
*G06Q 40/00* (2023.01)
*G06F 16/901* (2019.01)
(Continued)

(52) U.S. Cl.
CPC ....... *G06Q 20/4016* (2013.01); *G06F 16/901* (2019.01); *G06N 20/00* (2019.01)

(58) Field of Classification Search
CPC . G06Q 20/4016; G06F 16/901; G06F 16/906; G06N 20/00; G06N 3/044; G06N 5/02; G06N 3/08
See application file for complete search history.

(56) References Cited

U.S. PATENT DOCUMENTS 11,429,823 B1* 8/2022 Lan .......................... G06N 5/01
2004/0111305 A1* 6/2004 Gavan .................. H04Q 3/0062
706/47
(Continued)

FOREIGN PATENT DOCUMENTS

WO 2014152419 9/2014
WO WO-2014152419 A1 * 9/2014 ......... G06Q 20/4016
(Continued)

OTHER PUBLICATIONS

Anonymous, "What is Adaptive Authentication," OneLogin, www.onelogin.com; 2016 (Year: 2016).*
(Continued)

*Primary Examiner* — Abhishek Vyas
*Assistant Examiner* — William B. Bunker
(74) *Attorney, Agent, or Firm* — Kilpatrick Townsend & Stockton LLP

(57) ABSTRACT

Systems and methods of reconfiguring machine learning models are disclosed. A method includes receiving, by a server computer, external data and determining, by the server computer, a machine learning model from a plurality of machine learning models, based on the external data. The plurality of machine learning models are in standby mode. The server computer configures an AI engine with the machine learning model. The method also includes receiving, by the server computer, a prediction request from a client computer, processing the prediction request with the AI engine to form a prediction response, and sending the prediction response to the client computer.

20 Claims, 6 Drawing Sheets

(51) Int. Cl.
  *G06N 20/00* (2019.01)
  *G06Q 20/40* (2012.01)

(56) References Cited

U.S. PATENT DOCUMENTS

| | | |
|---|---|---|
| 2005/0267827 A1 | 12/2005 | Grant, Jr. et al. |
| 2013/0036038 A1 | 2/2013 | Nisal et al. |
| 2017/0213155 A1* | 7/2017 | Hammond ............ G06F 3/0482 |
| 2018/0011851 A1* | 1/2018 | Xiu ........................ G06N 20/00 |
| 2018/0293292 A1 | 10/2018 | Odibat et al. |
| 2018/0307945 A1* | 10/2018 | Haigh .................... G06F 18/214 |
| 2018/0357552 A1* | 12/2018 | Campos ................. G06N 3/08 |
| 2019/0349333 A1 | 11/2019 | Pickover et al. |
| 2020/0021620 A1 | 1/2020 | Purathepparambil et al. |
| 2020/0118137 A1 | 4/2020 | Sood et al. |
| 2020/0193286 A1 | 6/2020 | Byrnes et al. |
| 2020/0193443 A1 | 6/2020 | Piel |
| 2020/0195663 A1* | 6/2020 | Achituve ............... G06N 3/126 |
| 2020/0204531 A1 | 6/2020 | Hamm et al. |
| 2020/0327458 A1 | 10/2020 | Dutt et al. |
| 2020/0349281 A1* | 11/2020 | Van Dyne ........... G06F 21/6245 |
| 2020/0364718 A1 | 11/2020 | Hindi et al. |
| 2021/0042638 A1 | 2/2021 | Novotny |
| 2021/0326467 A1* | 10/2021 | Levy ..................... H04L 9/3226 |

FOREIGN PATENT DOCUMENTS

| | | | | |
|---|---|---|---|---|
| WO | 2019084321 | | 5/2019 | |
| WO | WO-2019084321 A1 * | | 5/2019 | ............ G06F 40/30 |
| WO | 2020097277 | | 5/2020 | |
| WO | WO-2020097277 A1 * | | 5/2020 | ............ G06F 17/18 |

OTHER PUBLICATIONS

Varmedja et al., "Credit Card Fraud Detection—Machine Learning methods," a8th International Symposium INFOTEH-JAHORINA, Mar. 20-22, 2019 (Year: 2019).*

Awoyemi et al., "Credit card fraud detection using Machine Learning Techniques: A Comparative Analysis," 978-1-5090-4642-3/17 IEEE 2017 (Year: 2017).*

U.S. Appl. No. 16/593,853, First Action Interview Pilot Program Pre-Interview Communication, dated Mar. 18, 2021, 4 pages.

U.S. Appl. No. 16/593,853, Notice of Allowance, dated Jun. 14, 2021, 24 pages.

Awoyemi et al., "Credit Card Fraud Detection Using Machine Learning Techniques: A Comparative Analysis", International Conference on Computing Networking and Informatics (ICCNI), IEEE, Oct. 2017, pp. 1-9.

Varmedja et al., "Credit Card Fraud Detection—Machine Learning Methods", 8th International Symposium Infoteh-Jahorina, 2019, 5 pages.

* cited by examiner

METHOD FOR DYNAMICALLY RECONFIGURING MACHINE LEARNING MODELS

CROSS-REFERENCES TO RELATED APPLICATIONS

None. This application is a continuation of U.S. patent application Ser. No. 16/593,853 filed on Oct. 4, 2019, which is hereby incorporated by reference in its entirety.

BACKGROUND

Some machine learning models are designed to make predictions and analyze things that are relatively constant time or in closely related contexts. However, models might need to make predictions that span a wide range of contexts. For example, a model can predict future behavior of a user. The behavior may vary significantly depending on factors such as time of year, vacations, recent major events, etc. Training a model to be robust within a wide range of contexts can result in a model that is too large or unwieldy.

Additionally, the contexts may be contradictory, and attempting to train a model with contradicting data may result in a model that is ineffective with all contexts. For example, a model may be used to authenticate a user based on the location of a log-in attempt. The model may be optimized to differentiate between log-in attempts while the user is at home and fraudulent log-in attempts. Another context that may contradict the optimized model may be while the user is logging in remotely on vacation. Log-in attempts while the user is on vacation may be legitimate, but may resemble fraudulent log-in attempts. While it may be possible to train a model with the home data, vacation data, and fraud data this may be time-consuming and may result in increased false positives and/or false negatives since the model is not optimized for a particular context.

Embodiments of the invention address these and other problems individually and collectively.

BRIEF SUMMARY

One embodiment of the invention includes receiving, by a server computer, external data and determining, by the server computer, a machine learning model from a plurality of machine learning models based on the external data. The method also includes updating, by the server computer, a configuration database with the machine learning model and configuring, by the server computer, an AI engine with the machine learning model using the configuration database. The method also includes receiving, by the server computer, a prediction request from a client computer, processing, by the server computer, the prediction request with the AI engine to form a prediction response, and sending, by the server computer, the prediction response to the client computer.

Another embodiment of the invention includes a server computer comprising a processor and a non-transitory computer-readable medium, comprising code executable by the processor for implementing a method comprising receiving external data and determining a machine learning model from a plurality of machine learning models based on the external data. The method also includes updating a configuration database with the machine learning model and configuring an AI engine with the machine learning model using the configuration database. The method also includes receiving a prediction request from a client computer, processing the prediction request with the AI engine to form a prediction response, and sending the prediction response to the client computer.

Further details regarding embodiments of the invention can be found in the Detailed Description and the Figures.

DETAILED DESCRIPTION

Figure 1:
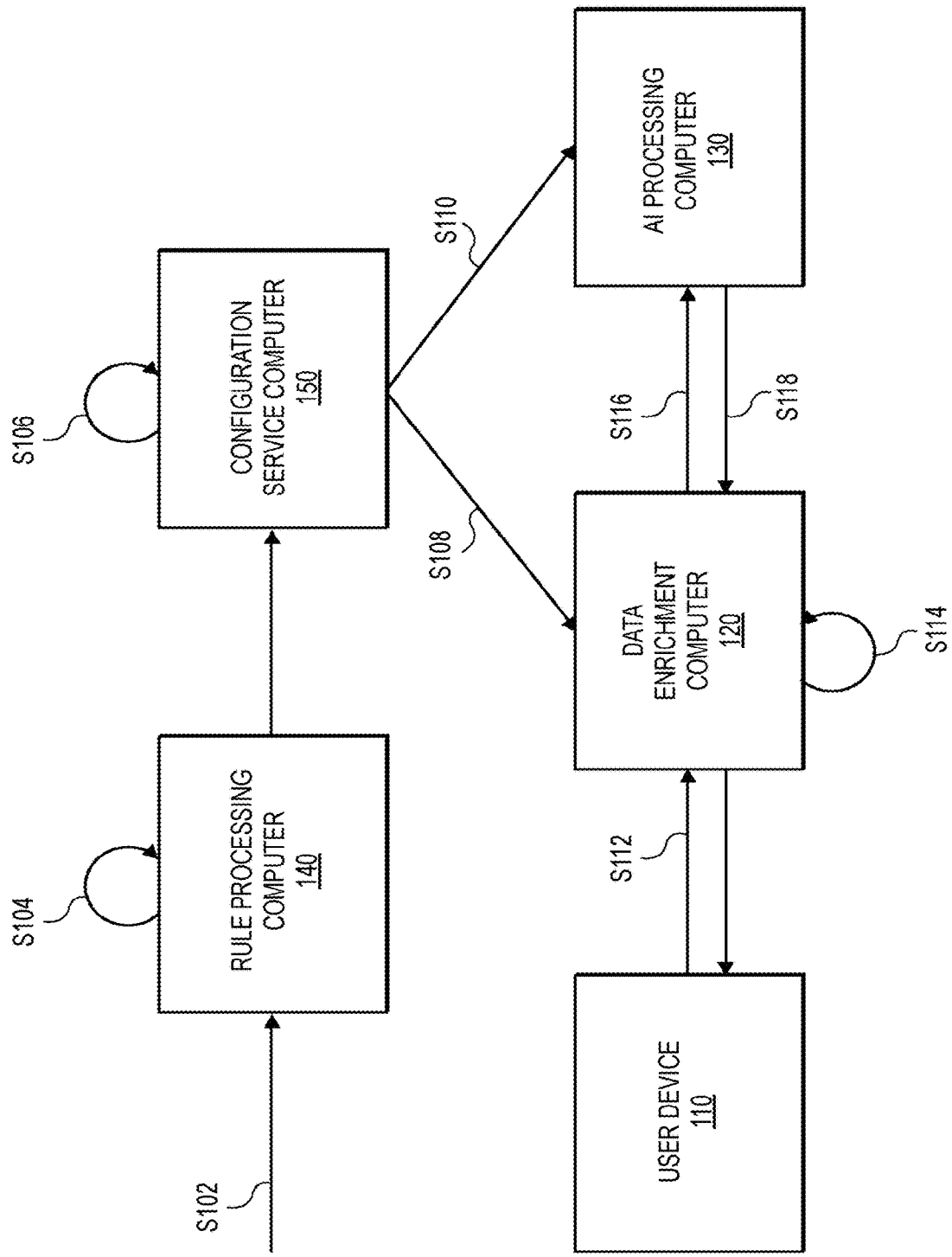
FIG. 1 shows a system and sequence diagram according to embodiments.

Embodiments of the invention can allow the use of a machine learning model for many different situations, by dynamically reconfiguring the machine learning model that is used to make predictions. Each of the machine learning models may be trained for a particular context or type of prediction request. For example, one embodiment may include a set of models, each trained for users in a different geographic location. In embodiments, the machine learning models may be classification models, such as for determining whether or not a transaction is fraudulent, or whether or not an attempt to log in to a secure data server is legitimate. Additionally, or alternatively, the machine learning models may be used to predict a value, such as a total future sales at a business or future traffic to a website. Each of the machine learning models can be deployed in stand-by mode on an AI processing computer so that it can be used when needed, based on the configuration of a computer that runs the machine learning models. The configuration can be stored in a configuration database in a configuration service computer.

Applications that use the machine learning models can cache portions of the configuration database, such as portions relating to particular users or machine learning models. When the application receives a prediction request to process with a machine learning model, the application can retrieve configuration information from the cache. Determining the configuration may be done by a rules system based on external data, prior to receiving a prediction request. By determining the configuration based on relevant external data, and on a user-by-user (or request-by-request) basis, the AI engine can be responsive to various requests. Embodiments thus address the difficulties that can exist with a large model that attempts to encompass everything in a single model.

Prior to discussing embodiments of the invention, some terms can be described in further detail.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPUs comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "user" may include an individual or a computational device. In some embodiments, a user may be associated with one or more user devices and/or personal accounts. In some embodiments, the user may be a cardholder, account holder, or consumer.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, which are models that classify data by establishing a gap or boundary between inputs of different classifications, and neural networks, which are collections of artificial "neurons" that perform functions by activating in response to inputs.

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K—means clustering. Clustering models can be used to partition input data or feature vectors into multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

An "AI engine" may comprise a plurality of models with artificial intelligence capabilities. Each model may perform tasks relating to one or more different areas of artificial intelligence, such as machine learning, natural language processing, and knowledge representation. The AI engine may be able to integrate the models, for example, to use the natural language processing to process a question and then use machine learning to generate a prediction in response to the question.

A "prediction request" may be a request for a predicted answer to a question. For example, a prediction request may be a request for some information about a future event, a classification prediction, an optimization, etc. The prediction request may be in the form of natural language (e.g., as an English sentence) or may be in a computer-readable format (e.g., as a vector). The answer to a prediction request may or may not be determined using artificial intelligence.

"Contextual data" may include data that provides circumstances surrounding an event, entity, or item. Contextual data may be additional information that gives a broader understanding or more detail about existing information or requests (e.g., a prediction request). In embodiments, contextual data may include transaction histories, geographic data, census data, etc.

"External data" may include data that provides circumstances surrounding an event, entity, or item. External data may be additional information that gives a broader understanding or more detail about a user or environment. In embodiments, external data may include transaction histories, geographic data, census data, etc.

A "cache" may be a hardware or software component that stores data to facilitate future retrieval of the data. The cache may be auxiliary memory or storage that can store a subset of a larger database.

A "configuration database" may be a database that stores configuration information for a software or hardware component. A "configuration" may include a set of information a software or hardware component. In embodiments, a configuration database may include information about a model, users, versions, software engines, etc.

An "in-memory database" may be a database that is stored in main memory of a computer. This may be in contrast to a database that is stored on disk storage of the computer. An in-memory database may allow for fast retrieval of data in the database. Some in-memory databases may store a copy of some or all of the database on disk storage. Examples of in-memory database software can include Redis, Memcached, and MonetDB.

A "key-value database" may be a database that stores data with a key that uniquely identifies a value that comprises the data. The value in a key-value database may be any type of data, such as an integer, a string, a date, etc. and any combination of data types. New keys and values can be added without impacting the rest of the database. This may be in contrast to a relational database, where the data structure and data types are predefined. Examples of key-value database software may include Redis, ArangoDB, and Dynamo.

"Standby mode" can describe a mode of a machine learning model. A machine learning model that is in standby mode can be a machine learning model that is deployed, but not being used. A deployed model may be in production and fully integrated into a system, and thus capable of being used by the system to generate predictions. A model that is in standby mode may be integrated into the system but may not receive inputs to process.

FIG. 1 shows a block diagram of a system according to embodiments. The system comprises a user device 110, a data enrichment computer 120, an AI processing computer 130, a rule processing computer 140, and a configuration service computer 150. Any of the devices in FIG. 1 may be in communication via a suitable communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

User device 110 can be a computer that sends prediction requests to be processed by a machine learning model. The user device 110 may be, for example, a laptop, a desktop computer, a smartphone, a server computer, etc. In some embodiments, the user device 110 may be operated by a user and may be a personal computer. In other embodiments, user device 110 may be a server computer that is part of a computer network. For example, the user device 110 may be part of a payment processing network.

Data enrichment computer 120 can add contextual data to a prediction request to ensure the prediction request has the correct information to be processed by the AI processing computer. For example, contextual data may include a timestamp, transaction data, geographic data, etc. The contextual data that is added may depend on the machine learning model, or the configuration. The configuration service computer 150 may send information about the contextual data needed for the machine learning model to the data enrichment computer 120. Additionally, or alternatively, the data enrichment computer 120 may query a configuration table to determine the contextual data needed for a prediction request.

AI processing computer 130 may be a computer that executes machine learning models using an AI engine. AI processing computer 130 may use the AI engine to operate a plurality of machine learning models. In some embodiments, the machine learning models may be in standby mode on the AI processing computer 130. In standby mode, a machine learning model may be trained and deployed, but may not be active. In some embodiments, the AI processing computer 130 may only have one active machine learning model at a time. The active machine learning model may be the machine learning model that the AI engine uses to process a received prediction request.

Rule processing computer 140 may determine a machine learning model from a plurality of machine learning models based on external data. External data may include, for example, transaction data, location data, seasonal data, etc. The external data may be received from sources such as public data sources (e.g., news sources, weather reports) and protected user data (e.g., payment processing networks, user location databases). In some embodiments, the rule processing computer 140 can apply rules to the external data to determine the machine learning model. For example, the external data may include transaction data indicating that a user purchased an airplane ticket and a hotel room. This may trigger a rule that the user is likely on vacation and the rule processing computer 140 may determine that a vacation machine learning model is appropriate. As another example, the external data may be a location of a user and a date, indicating that there is an upcoming holiday in the location of the user. For example, in the United States, users may have different spending habits in the "holiday season" of November and December. Thus, rule processing computer 140 may determine a holiday machine learning model after receiving external data indicating that a user is in the United States and that it is during the holiday season.

Configuration service computer 150 may maintain a configuration database for configuring machine learning models. The configuration service computer 150 can maintain an in-memory database that stores the configuration database. The configuration service computer 150 may also cache the configuration database to external storage. The configuration service computer 150 may receive information about a machine learning model from the rule processing computer 140, then update the configuration database based on the machine learning model. For example, the configuration service computer 150 may update the configuration database to add a model or disable a currently enabled model.

Figure 2:
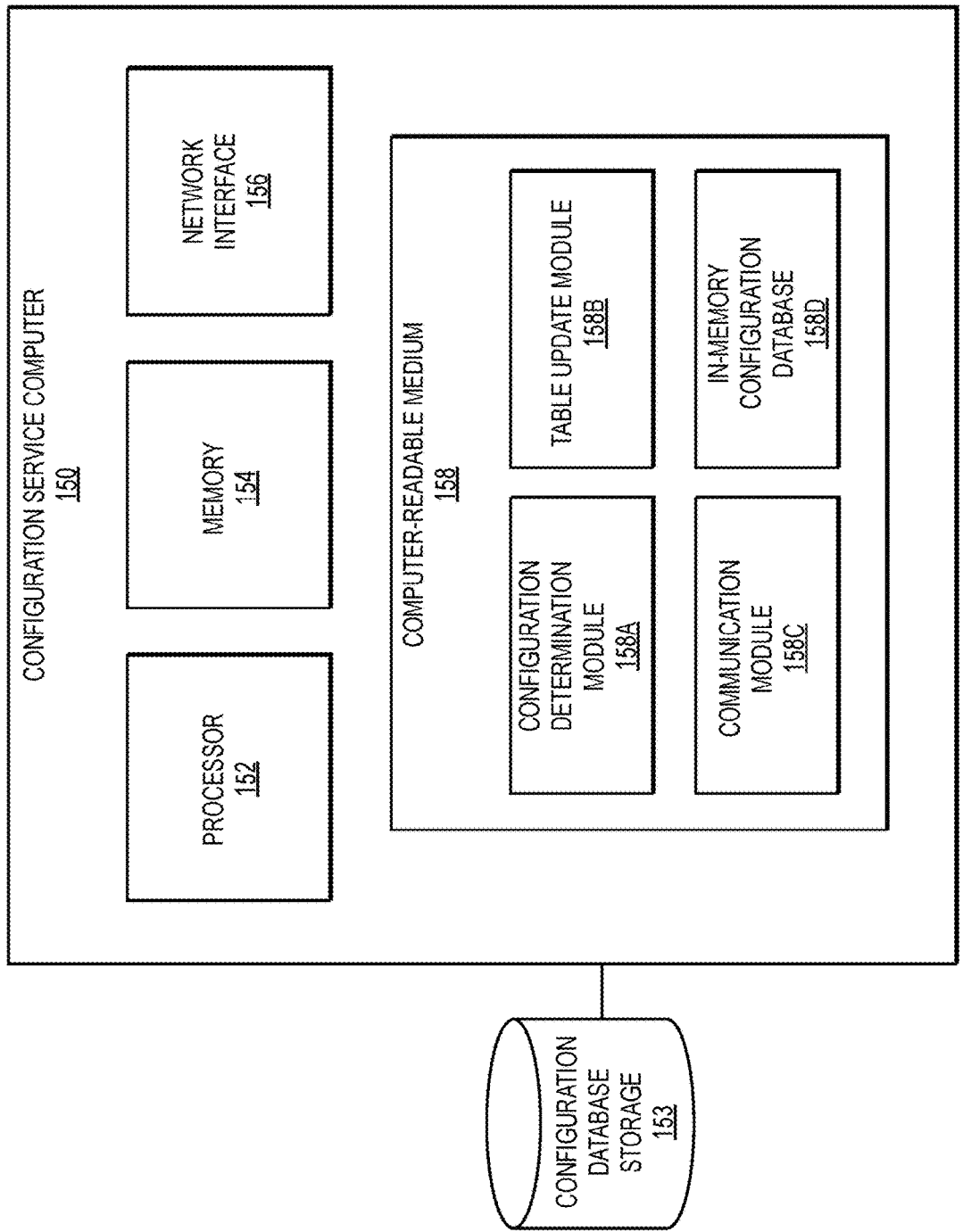
FIG. 2 shows a block diagram of a configuration service computer according to embodiments.

FIG. 2 shows a block diagram of a configuration service computer 150. Configuration service computer 150 comprises a processor 152, a memory 154, a network interface 156, and a computer-readable medium 158. The computer-readable medium 158 can comprise a configuration determination module 158A, a table update module 158B, a communication module 158C, and an in-memory configuration database 158D. The computer may also comprise a configuration database storage 153

The processor 152 may be implemented as one or more integrated circuits (e.g., one or more single core or multicore microprocessors and/or microcontrollers). The processor 152 may be used to control the operation of the configuration service computer 150. The processor 152 can execute a variety of programs in response to program code or computer-readable code stored in memory 154. The processor 152 may include functionality to maintain multiple concurrently executing programs or processes.

The memory 154 may be implemented using any combination of any number of non-volatile memories (e.g., flash memory) and volatile memories (e.g., DRAM, SRAM), or any other non-transitory storage medium, or a combination of media. Memory 154 may store the in-memory configuration database 158D.

Network interface 156 may be configured to connect to one or more communication networks to allow configuration service computer 150 to communicate with other entities such as rule processing computer 140, AI processing computer 130, etc. For example, communication with the rule processing computer 140 can be direct, indirect, and/or via an API.

Computer-readable medium 158 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 158 may be any combination of such storage or transmission devices.

Configuration determination module 158A, in conjunction with the processor 152, can determine a configuration that corresponds to a particular machine learning model. Configuration determination module 158A may include a table or database with configuration information for a plurality of models. For example, configuration determination module 158A may receive an indication to use Model A for user 1234. Configuration determination module 158A can then determine a configuration for Model A (e.g., a machine learning model version, a software engine, etc.). In some embodiments, configuration determination module 158A may determine that the configuration database already includes configuration information for Model A to be used for user 12134, and thus the configuration database should be updated to enable Model A for user 1234.

Table update module 158B, in conjunction with the processor 152, can update the configuration table. The table update module 158B may receive configuration information from the configuration determination module 158A. The table update module 158B may access the configuration database storage 153. Additionally, the table update module 158B may access the in-memory configuration database 158D. In some embodiments, table update module 158B may check that only one model is active for a user at a time.

Communication module 158C, in conjunction with the processor, may communicate configuration information to other devices, such as data enrichment computer 120 and AI processing computer 130. In some embodiments, the communication module may send the configuration information directly to the other computers. In other embodiments, the communication module 158C can send an indication to the other computers that the configuration database has been updated.

In-memory configuration database 158D may be a database storing configuration information (e.g., machine learning model version number, software engine, etc.) about a plurality of machine learning models. The in-memory configuration database 158D may be a key-value in-memory database such as Redis.

Configuration database storage 153 may be an external storage of the configuration database. The configuration database storage 153 may be a cache of the in-memory configuration database 158D. The configuration database may be stored in the configuration database storage 153, for example, every few seconds, every few minutes, or every few seconds. Configuration database storage 153 may be a hard disk drive, a solid-state drive, an optical storage device (e.g., a CD or DVD drive), or the like.

Returning to FIG. 1, a process flow can be described.

In step S102, rule processing computer 140 can receive external data from one or more external data sources. The external data may comprise transaction data, temporal data, etc. The external data (not shown) may be received from sources such as public data sources (e.g., news sources, weather reports) and protected user data (e.g., payment processing networks, user location databases). In some embodiments, the rule processing computer 140 may receive the external data continuously or periodically. For example, the external data from one source may be received every hour or every day. Other external data may be received sporadically. For example, the rule processing computer 140 may receive transaction data for a particular user from a payment processing network when the user conducts a transaction. In some embodiments, the external data may be associated with a particular user identifier (e.g., a PAN, a phone number, an email address). As an example, rule processing computer 140 may receive information that a user has purchased a plane ticket and reserved a hotel room, including the PAN of the user.

In step S104, rule processing computer 140 can determine a machine learning model from a plurality of machine learning models by applying rules to the external data. For example, the rule processing computer 140 may have a rule that Model A should be enabled for all users in a particular country. As another example, the rule processing computer 140 may have a rule that Model B (e.g., a vacation fraud detection model) should be enabled for users that have recently made a purchase at a particular merchant (e.g., hotel, airline). The plurality of machine learning models may comprise different machine learning models. For example, the plurality of machine learning models may include deep learning models (e.g., support vector machine, recurrent neural network) and business rule models. Additionally, or alternatively, the plurality of machine learning models may include different versions of one or more machine learning models. For example, one version of a model may be a fraud prediction model for a user in summer and another version may be a fraud prediction model for a user in winter. Therefore, determining the machine learning model may include determining the model and the version.

After determining a machine learning model, the rule processing computer 140 can send an indication to the configuration service computer 150 about the determined machine learning model. The indication may include information such as a name and version of the machine learning model. In some embodiments, the rule processing computer 140 can determine the machine learning model on an individual user basis. For example, rule processing computer 140 may determine that Model B (e.g., a vacation fraud detection model) should be enabled for user 1234 because user 1234 has recently made a purchased a plane ticket and hotel reservation. Then the indication may also include the user identifier. In other embodiments, the rule processing computer 140 can determine the machine learning model for a plurality of users. For example, if the rule processing computer 140 determines that it is a holiday season in a particular geographic region, then the rule processing computer 140 may determine a holiday machine learning model for all users in the geographic region. For example, a "holiday" machine learning model may be determined for all users in the United States during November and December.

In step S106, the configuration service computer 150 can configure an AI engine with the machine learning model by updating a configuration database. The configuration database may be a an in-memory database that stores configuration data for executing machine learning models on an AI engine of the AI processing computer 130. In updating the configuration table, the configuration service computer 150 can change values in the configuration table to enable or disable particular machine learning models. In some embodiments, there may be a value in the configuration table to indicate that a machine learning model is enabled or disabled. There may also be a value indicating a particular version of the machine learning model (e.g., version 2.7 or version 3.1).

In some embodiments, the configuration service computer 150 may update the configuration table for a particular user. The configuration service computer 150 may use the user identifier when updating the configuration table. Alternatively, the configuration service computer 150 may update the configuration table for a plurality of users or range of user identifiers, such as all users in a geographic area.

In step S108, the configuration service computer 150 can send an indication of the machine learning model to data enrichment computer 120. Additionally, or alternatively, the configuration service computer 150 can send an indication that the configuration database has been updated. The data enrichment computer 120 can use the indication of the machine learning model to determine what contextual data to add to a prediction request. In some embodiments, the data enrichment computer 120 can query the configuration table to determine what contextual data to add.

In step S110, the configuration service computer 150 can send an indication of the machine learning model to AI processing computer 130. Additionally, or alternatively, the configuration service computer 150 can send an indication that the configuration database has been updated. In some embodiments, the AI processing computer 130 may periodically cache the configuration database. When the AI processing computer 130 caches the configuration database with updated configuration information, the AI processing computer 130 may treat this as an indication of the machine learning model. For example, if the machine learning models are neural networks, the AI engine may store matrices with weights of neurons for the plurality of machine learning models. The configuration information may indicate which matrix of weights (and thus which neural network) should be used. In some embodiments, the AI engine may have a plurality of machine learning models in standby mode. Machine learning models may be models that are deployed and integrated into a prediction generation system but may not be actively used in generating predictions.

In step S112, user device 110 can send a prediction request to data enrichment computer 120. The prediction request can be a request for a prediction or classification from a machine learning model. For example, a prediction request can be a fraud prediction for a transaction or a log-in attempt. In a transaction example, the prediction request may comprise an indicator that it is a fraud request, a user identifier, a transaction amount, a merchant identifier, a location, and a time stamp. In a log-in example, the prediction request may comprise an indicator that it is an authorization request, a user identifier, a device identifier, a password (or a derivative of the password), a location, and a time stamp. As an example, user device 110 may send an authorization request to data enrichment computer 120 for a transaction that a user is making while on vacation. In some embodiments, the user device 110 can be a computer operated by a user, such as a laptop or smartphone. The prediction request may be generated, for example, by the user typing in a question or speaking a question. The prediction request may be generated, for example, in response to receiving an authentication or authorization request message.

In step S114, data enrichment computer 120 can enrich the prediction request with contextual data. Contextual data may include, for example, transaction data or geographic data and may be received from, for example, a location service or a payment processing network. For example, if the prediction request is an authorization request for a user that is on vacation, the data enrichment computer 120 may add information about the past three transactions that were made by the user. Some or all of the contextual data added by the data enrichment computer 120 may be dependent on the machine learning model. As an example, the prediction request for a fraud prediction may not have included a location of the interaction, but the machine learning model may require a location as input for the fraud prediction. The data enrichment computer 120 may then determine a location to enrich the fraud prediction.

In some embodiments, the data enrichment computer 120 can use the indication of the machine learning model to determine the contextual data to add. In other embodiments, the data enrichment computer 120 may use the configuration database to determine the contextual data to add. For example, the data enrichment computer 120 may query the configuration database to identify the determined machine learning model. Additionally, or alternatively, the configuration database may include values indicating the appropriate contextual data, and the data enrichment computer 120 may query the configuration table to determine the contextual data needed. For example, the configuration database may indicate that a timestamp should be added to a query. Data enrichment computer 120 can also format the prediction request into an appropriate format for the AI processing computer 130.

In step S116, data enrichment computer 120 can send the enriched prediction request to AI processing computer 130. The AI processing computer 130 can then process the prediction request with the machine learning model on the AI engine. For example, if the prediction request is an authorization request for a user that is on vacation, the AI processing computer 130 can determine whether or not the transaction is fraudulent with a vacation transaction fraud model. This may be a different fraud model than might have been used if the user was at home. The AI processing computer 130 can determine the machine learning model from the configuration table. The configuration table may also include other information for configuring the machine learning model.

The AI processing computer 130 can then generate a prediction response with the machine learning model. For example, if the prediction request is a fraud prediction request for a transaction, the AI processing computer 130 can return a prediction response indicating whether to or not the transaction is fraudulent. In some embodiments, the prediction response may be a classification (e.g., fraud or not fraud). In other embodiments, the prediction response may be a value (e.g., predicted traffic to a website).

In step S118, AI processing computer 130 can return the prediction response to the user device 110. For example, AI processing computer 130 can return an authorization response message to the user device 110. In some embodiments, the AI processing computer 130 can return the prediction response to the user device 110 directly. In some embodiments, the AI processing computer 130 can return the prediction response to the user device 110 through data enrichment computer 120.

Figure 3:
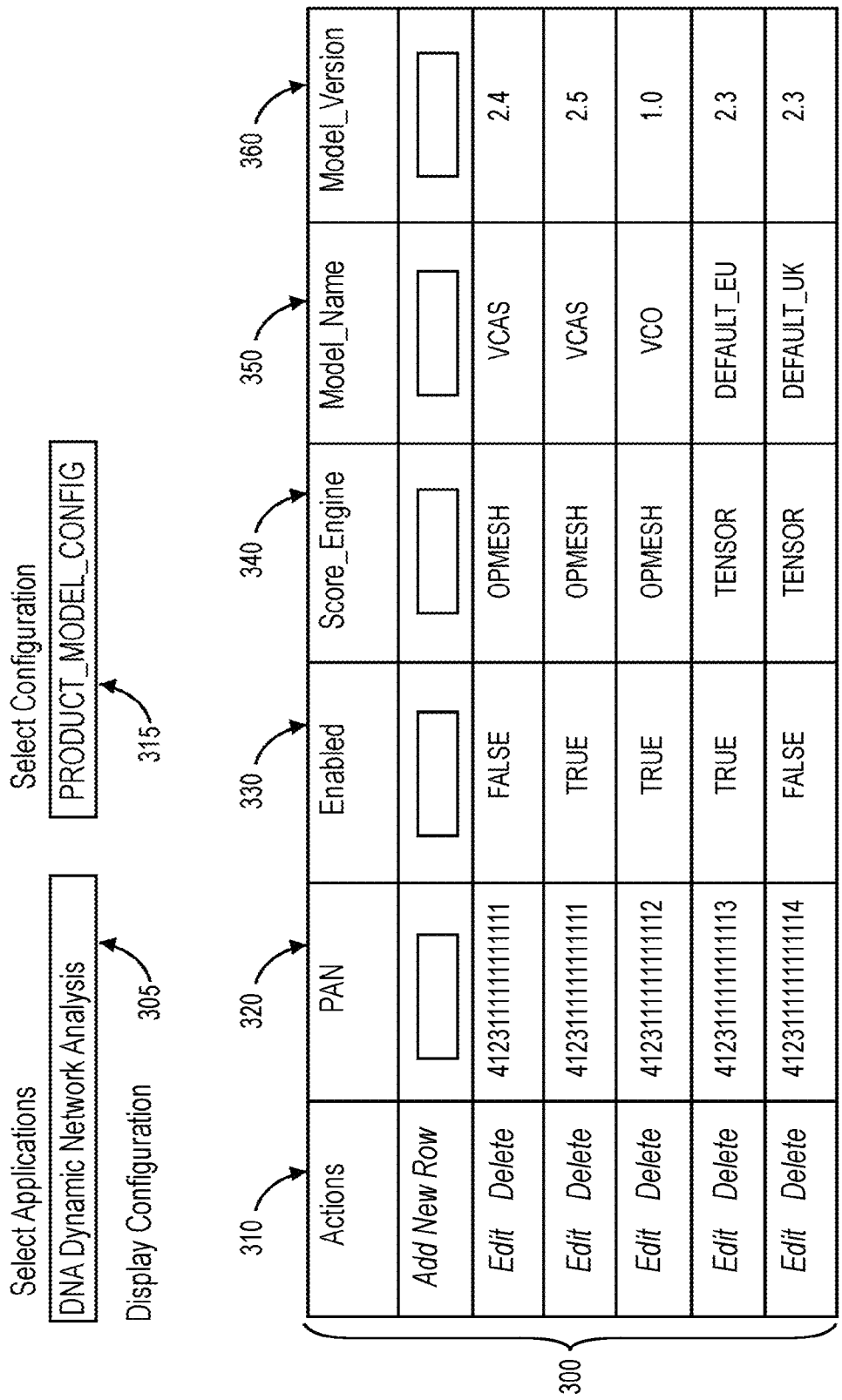
FIG. 3 shows a user interface for a configuration database according to embodiments.

FIG. 3 shows an exemplary configuration table according to embodiments. This may be a user interface for viewing or modifying the configuration database. In some embodiments, the user interface may display a cache of the configuration database, and changes made to the configuration database through the user interface may be sent to the configuration service computer to update the configuration database. The user interface may be presented through the configuration service computer, the AI processing computer, or another computer with access to the configuration database.

Block 305 may be a menu for selecting an application. Different applications can use the configuration database. Each application can have an AI processing computer that uses a saved configuration table. For example, the application may be Visa Dynamic Network Analysis.

Block 315 may be a menu for selecting a particular configuration to view. An application may have multiple configurations available. As an example, this configuration can be displayed as product_model_config. After a configuration is selected, it can be displayed in the table 300.

Table 300 shows a table of configuration information. The table has columns for configuration information for each user. New rows can be added to the table, and existing rows can be edited or deleted. The table may be built from a plurality of values of a configuration database. For example, each row of the configuration table may be stored as a separate value in the configuration database.

Column 310 shows actions that can be performed on the data in the table. There may be an option to enter data for a new row. In existing rows, there may be an option to edit the data and an option to delete the row.

Column 320 shows user identifiers, such as primary account numbers (PANs) of users. Other embodiments may use other user identifiers (e.g., a phone number, email, merchant identifier, address, etc.). In some embodiments, column 320 may display a value derived from a user identifier (e.g., a hash, a token) to protect user information. Some user identifiers may appear in multiple rows (such as 4123111111111111 in the exemplary table), which may indicate that there are multiple possible configurations available for that user.

Column 330 shows an indication of whether or not the machine learning model is enabled. The column may contain values such as "true" and "false", "0" and "1", or "enabled" and "disabled". The configuration database may use uniqueness checking to ensure that only one model is enabled for a particular user identifier at a time.

Column 340 shows the software engine that can run the machine learning model. The software engine may be deep learning software, such as TensorFlow. Deep learning software may be used for running machine learning models. Additionally, or alternatively, the software engine may be rules engine software such as OpMesh. A rules engine may be used for running a business rules model.

Column 350 shows the name of the machine learning model. For example, models can include VCAS and VCO. Some models may be location specific, such as "default_EU" and "default_UK".

Column 360 shows the version of the machine learning model. Each model may have one or more versions. In some embodiments, later versions of a machine learning model may indicate an improvement in quality over past models. In other embodiments different versions of the model may be developed for a variety of situations. For example, version 2.4 of a fraud prediction model may be trained for a user in their home region. Version 2.5 of the same fraud prediction model may be trained for the user when the user is on vacation.

Figure 4A:
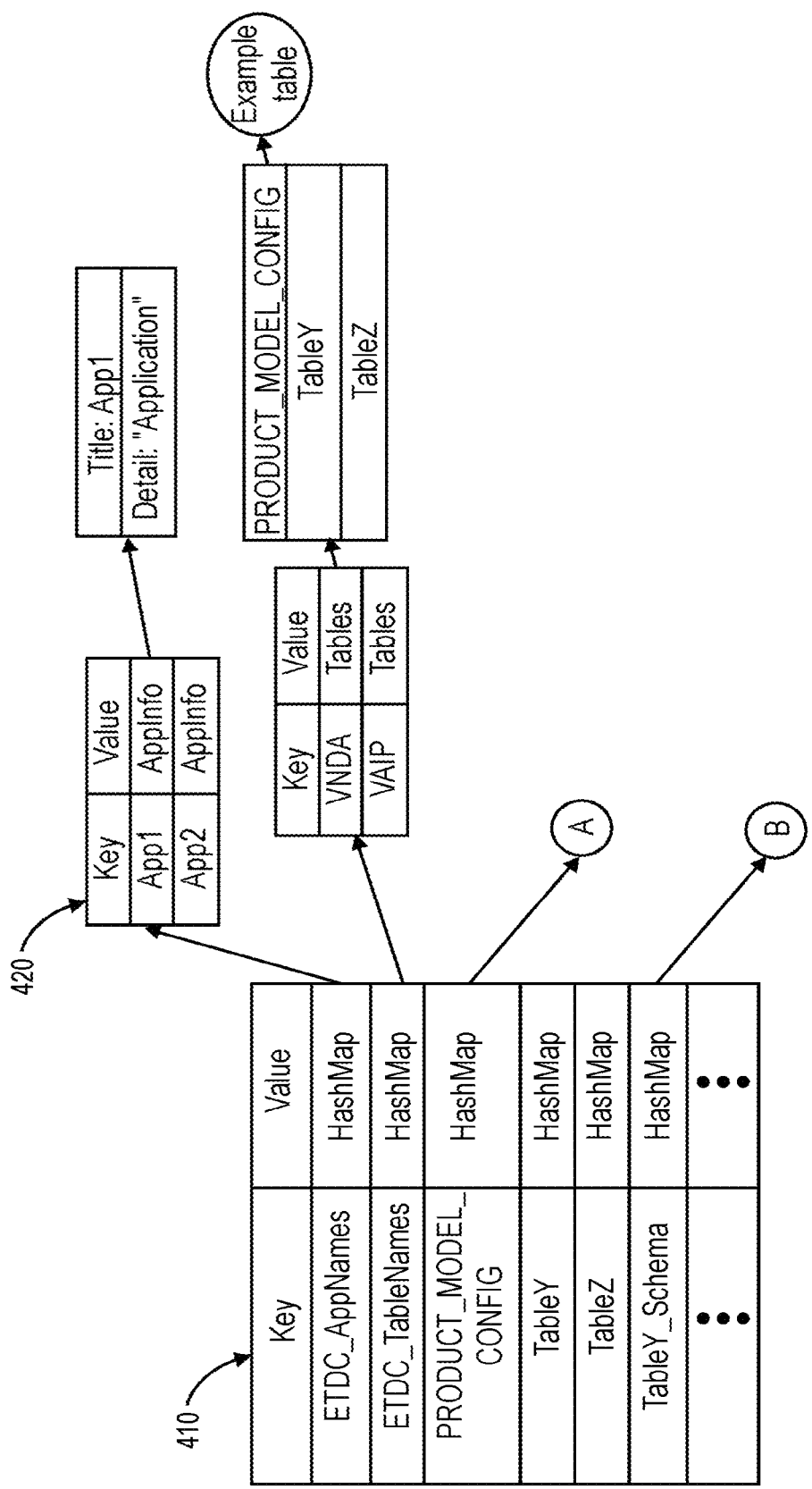
FIG. 4A and FIG. 4B show an exemplary configuration database according to embodiments.
Figure 4B:
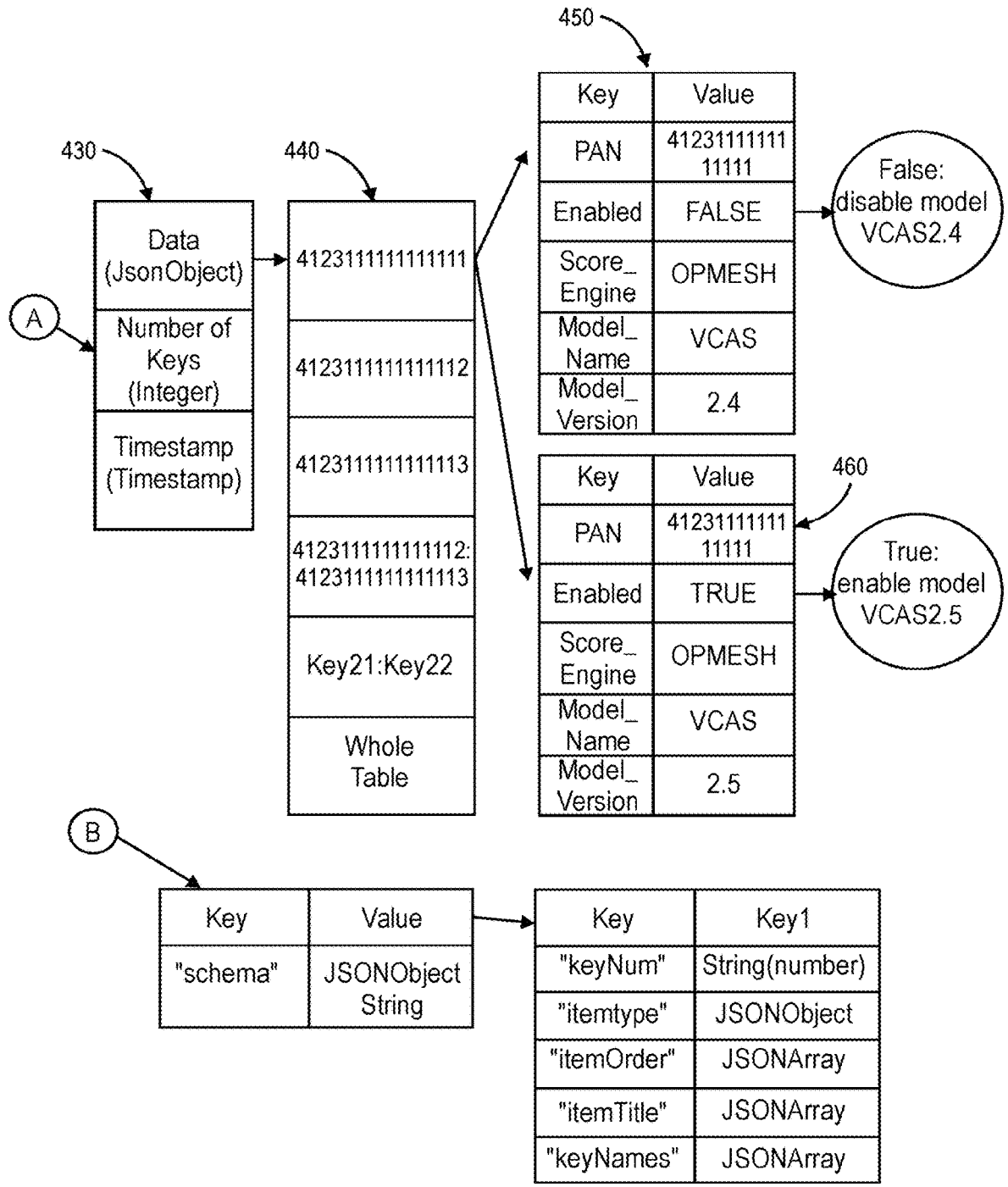

FIG. 4A and FIG. 4B show a configuration database of a configuration service computer. The configuration database may be an in-memory key-value database. The configuration database can be stored in the memory of the configuration service computer. The configuration database may be periodically backed up to disk storage of the configuration service computer. For example, the configuration database may be backed up every few seconds, every few minutes, or every hour. In some embodiments, the entire configuration database may be backed up. In other embodiments, the configuration service computer may maintain a record of changes that are made to the configuration database and may periodically update the stored database with the changes.

The configuration database may be a NoSQL database, such as Redis. Redis is a key-value database, and can store data types other than (and including) strings. Table 410 is a table with some key-value pairs. One key may be product_model_config, which maps to a hash map of other information. Another key in the table 410 is ETDC_AppNames, which maps to a table 420 that links to information about the applications, like App1 which has information about the application.

Table 410 may also include a hashmap containing the configuration information. The key of table 410 have a key for a particular machine learning model, such as product_model_config. The value of table 410 may be another table 430. Table 430 may be a hashmap. One element of table 430 may be a list of user identifiers (e.g., PANs) in table 440. Each user identifier in 430 can have a value with the configuration information. There may be multiple values associated with the user identifier, such as table 450 and 460. Each of the tables 450, 460 may include configuration information for a particular machine learning model.

Table 450 comprises a key for user identifier, whether or not the model is enabled, the score engine, the model name, and the model version. Both table 450 and table 460 can be associated with the same key of the user identifier and thus may have similar values.

Figure 5:
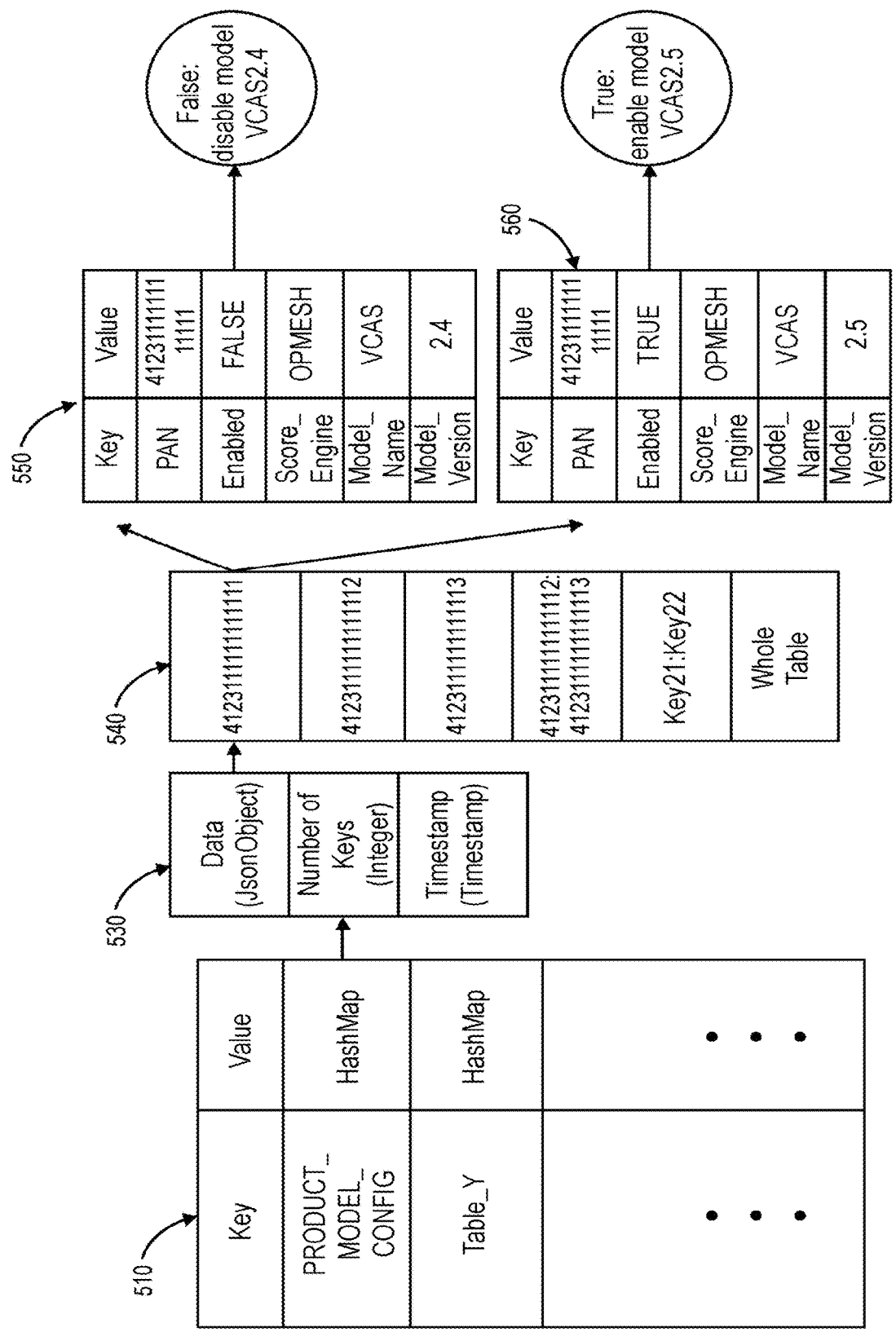
FIG. 5 shows an exemplary cached configuration database according to embodiments.

FIG. 5 shows a cache of the configuration database. In some embodiments, the cache can be a Guava cache. Other embodiments can use other cache programs. The cache may include a portion of the configuration database. The portion may include configuration information relating to particular users, machine learning models, or applications.

When the portion of the database is cached, it can be cached to an application computer. The application computer might be the AI service computer, if the AI service is a particular application. The database may be cached to the application computer periodically. For example, the application computer may update the cache every hour. Additionally, or alternatively, the application computer may receive an indication that the database has been updated and then cache the database.

The cached database can comprise a table 510. The table 510 may be a subset of the table 410 of FIG. 4. The parts of 410 that are transferred to table 510 may be the elements of 410 that relate to a particular machine learning model configuration, such as product_model_config. Not sure how much of the table is also transferred.

All data related to a particular machine learning model configuration (e.g., product_model_config) can be cached. For example, table 530 may be table 430, table 540 may be table 440, table 550 and 550 may be tables 460 and 460, respectively. The tables may be static, and may represent the makeup of the corresponding tables at the time they were cached.

Embodiments of the invention provide a number of advantages. Embodiments can allow the use of several machine learning models to address different situations that might be used to process data and generate predictions. Embodiments allow a plurality of models to be trained, each specialized for a particular situation and context. By deploying each model in standby mode, they can be prepared without being active.

Embodiments can allow responsive model usage. In some instances, the process of developing, training, and deploying a new machine learning model can take several months. By the time a new model is developed for a situation, the situation may no longer be relevant. Creating one model that encompasses all situations can result in a model that is very large. Additionally, the model may not even be able to be optimized with too many different types of training data. Instead of developing a machine learning model for a particular context and hoping that the model is broad enough to cover future changes, the AI processing computer can easily change machine learning models, in a matter of minutes or seconds instead of months, to respond to changes as they arise. This may also allow for predicting future user actions, such as predicting that a user will go on vacation and enabling an appropriate model for that user. Enabling computers to cache the configuration database can allow wider use of the configuration information. In embodiments, a central computer (or group of computers) can determine appropriate models and then applications that use those models can cache the configuration database so that they can retrieve the configuration information as needed Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for dynamically configuring an AI engine for processing requests from a user, the method comprising:
    training, by a server computer, a plurality of machine learning models, wherein each machine learning model is trained with respect to a context of a plurality of contexts, wherein each context defines a nature of a request from the user;
    generating, by the server computer, based on historical data associated with the user, a configuration table to be associated with the user, the configuration table including a hash map that links an identifier of the user to a plurality of tables, each table of the plurality of tables being associated with a machine learning model of the plurality of machine learning models, and including configuration information associated with the machine learning model, the configuration information being required for executing the machine learning model, wherein the hash map is a data structure that stores data as key-value pairs, and wherein values for each key define the configuration information for a particular machine learning model;
    determining, by the server computer, rules for applying one of the plurality of the machine learning models to the request from the user with respect to a given context of the plurality of contexts;
    receiving, by the server computer, the request from a client computer operated by the user, the request being associated with a first context of the plurality of contexts;
    selecting, by the server computer, based on the first context, a first machine learning model from the plurality of machine learning models using the hash map included in the configuration table associated with the user;
    configuring, by the server computer, the AI engine with the configuration information corresponding to the machine learning model obtained from the configuration table;
    enriching, by the server computer, the request with contextual information based on the configuration information received from the configuration table;
    processing, by the server computer, based on the configuration information, the request with the AI engine to form a response; and
    sending, by the server computer, the response to the client computer.

2. The method of claim 1, wherein the server computer selects the first machine learning model based on a second context associated with the first machine learning model matching the first context associated with the request.

3. The method of claim 1, further comprising:
    receiving, by the server computer, external data from one or more public data sources, the external data including information related to the user; and
    determining, by the server computer, the first machine learning model to be used to generate the response based on the external data.

4. The method of claim 3, wherein the external data includes data related to an event occurring in an environment of the user.

5. The method of claim 3, wherein the external data includes data indicating that the user is in a particular geographic region.

6. The method of claim 1, wherein the plurality of machine learning models comprises different machine learning models.

7. The method of claim 1, wherein the plurality of machine learning models comprises different versions of the first machine learning model.

8. The method of claim 1, wherein the configuration information includes a type of AI engine used to implement the first machine learning model, a name of the first machine learning model, a version of the first machine learning model, and a status indicator indicating an operational status of the first machine learning model.

9. The method of claim 8, further comprising:
    maintaining, by the server computer, the plurality of machine learning models in a standby mode; and
    updating the status indicator of the first machine learning model based on the selecting.

10. The method of claim 1, wherein the hash map links the identifier of the user to the first machine learning model and a second machine learning model, and wherein a first configuration information associated with the first machine learning model is different from a second configuration information associated with the second machine learning model.

11. A server computer for dynamically configuring an AI engine for processing requests from a user, the server computer comprising:

a processor; and a non-transitory computer-readable medium, comprising code executable by the processor for implementing a method comprising:

training a plurality of machine learning models, wherein each machine learning model is trained with respect to a context of a plurality of contexts, wherein each context defines a nature of a request from the user;

generating, based on historical data associated with the user, a configuration table to be associated with the user, the configuration table including a hash map that links an identifier of the user to a plurality of tables, each table of the plurality of tables being associated with a machine learning model of the plurality of machine learning models, and including configuration information associated with the machine learning model, the configuration information being required for executing the machine learning model, wherein the hash map is a data structure that stores data as key-value pairs, and wherein values for each key define the configuration information for a particular machine learning model;

determining rules for applying one of the plurality of the machine learning models to the request from the user with respect to a given context of the plurality of contexts;

receiving the request from a client computer operated by the user, the request being associated with a first context of the plurality of contexts;

selecting, based on the first context, a first machine learning model from the plurality of machine learning models using the hash map included in the configuration table associated with the user;

configuring the AI engine with the configuration information corresponding to the machine learning model obtained from the configuration table;

enriching the request with contextual information based on the configuration information received from the configuration table;

processing based on the configuration information, the request with the AI engine to form a response; and sending the response to the client computer.

12. The server computer of claim 11, wherein the server computer selects the first machine learning model based on a second context associated with the first machine learning model matching the first context associated with the request.

13. The server computer of claim 11, wherein configuring the AI engine comprises changing one or more of the plurality of machine learning models, a version of the particular machine learning model, and/or a software engine used to execute the particular machine learning model.

14. The server computer of claim 11, wherein the hash map links the identifier of the user to the first machine learning model and a second machine learning model, and wherein a first configuration information associated with the first machine learning model is different from a second configuration information associated with the second machine learning model.

15. The server computer of claim 11, wherein the processor is further configured for:

receiving external data from one or more public data sources, the external data including information related to the user; and determining the first machine learning model to be used to generate the response based on the external data.

16. The server computer of claim 11, wherein the configuration information includes a type of AI engine used to implement the first machine learning model, a name of the first machine learning model, a version of the first machine learning model, and a status indicator indicating an operational status of the first machine learning model.

17. The server computer of claim 16, wherein the processor is further configured for:

maintaining, by the server computer, the plurality of machine learning models in a standby mode; and updating the status indicator of the first machine learning model based on the selecting.

18. The server computer of claim 11, a portion of the configuration information is cached.

19. The server computer of claim 18, wherein the portion of the configuration information is cached in an AI processing computer, and wherein the AI processing computer comprises the AI engine.

20. The server computer of claim 11, wherein the request is a fraud detection request or a secure log-in request.

* * * * *